(12) United States Patent
Visioli et al.

(10) Patent No.: US 9,104,782 B2
(45) Date of Patent: Aug. 11, 2015

(54) SYSTEM AND METHOD FOR SEARCHING REAL ESTATE LISTINGS USING IMAGERY

(75) Inventors: Anna Visioli, Parsippany, NJ (US);
Michael Fischer, Parsippany, NJ (US);
Helen Galasso, Parsippany, NJ (US)

(73) Assignee: Coldwell Banker Real Estate LLC, Parsippany, NJ (US)

( * ) Notice: Subject to any disclaimer, the term of this patent is extended or adjusted under 35 U.S.C. 154(b) by 340 days.

(21) Appl. No.: 13/271,512

(22) Filed: Oct. 12, 2011

(65) Prior Publication Data
US 2012/0089597 A1    Apr. 12, 2012

Related U.S. Application Data

(60) Provisional application No. 61/392,351, filed on Oct. 12, 2010.

(51) Int. Cl.
*G06F 17/30* (2006.01)
*G06Q 50/16* (2012.01)

(52) U.S. Cl.
CPC .......... *G06F 17/30967* (2013.01); *G06Q 50/16* (2013.01)

(58) Field of Classification Search
CPC .................................. G06F 17/30967
See application file for complete search history.

(56) References Cited

U.S. PATENT DOCUMENTS

| | | | |
|---|---|---|---|
| 2003/0229628 A1* | 12/2003 | Banerjee et al. | 707/3 |
| 2005/0021551 A1* | 1/2005 | Silva et al. | 707/102 |
| 2005/0246336 A1* | 11/2005 | Stauder et al. | 707/6 |
| 2006/0205439 A1* | 9/2006 | Havukainen | 455/567 |
| 2007/0043770 A1* | 2/2007 | Goodrich et al. | 707/104.1 |
| 2007/0156677 A1* | 7/2007 | Szabo | 707/5 |
| 2009/0319512 A1* | 12/2009 | Baker et al. | 707/5 |

* cited by examiner

*Primary Examiner* — Syed Hasan
(74) *Attorney, Agent, or Firm* — St. Onge Steward Johnston & Reens LLC

(57) ABSTRACT

A system and method for searching real estate uses non-traditional techniques. A selection of suggestive imagery may be rated by a user in order to indicate that user's subjective tastes. The suggestive images may relate to particular keywords which also may be related to real estate listings. This way, properties which appeal to a user's tastes may be identified and sorted accordingly.

12 Claims, 7 Drawing Sheets

SYSTEM AND METHOD FOR SEARCHING REAL ESTATE LISTINGS USING IMAGERY

CROSS-REFERENCE TO RELATED APPLICATIONS

This patent application claims the benefit, under 35 U.S.C. §119(e), of U.S. Provisional Patent Application Ser. No. 61/392,351, filed on Oct. 12, 2010, the content of which is incorporated herein by reference in its entirety.

FIELD OF THE INVENTION

The present teachings relate generally to the field of real estate and, more particularly, to a system and method for searching real estate listings using non-traditional searching techniques including rating suggestive imagery.

BACKGROUND OF THE INVENTION

Buying a home is one of the most important and expensive experiences in a person's life. It is also a very personal experience which is ultimately driven by a buyer's instincts and subjective preferences. There are many different types of available real estate and the home a person buys ultimately depends on the quality of information he or she is able to obtain prior to purchase.

Listings of available real estate are typically stored in a central computer system, generally referred to as a "multiple listing service". This computer-stored listing may be accessed through terminals for retrieval of specific information relating to properties. However, searching the stored information is typically dependent on traditional attributes such as the number of bedrooms or bathrooms. While one may be searching for a house having certain attributes (e.g., 3 bedrooms, 2 bathrooms), those attributes alone provide little indication that a house satisfying that criteria will appeal to a buyer's more subjective preferences. The techniques currently used to search real estate listings are antiquated and largely ineffective for a number of potential real estate buyers.

Many times when looking at properties which satisfy the buyer's search criteria, the buyer does not even enter a number of properties because he or she can tell from their outward appearance or feel of the neighborhood that they are unsuitable. The need to physically visit each and every property in a market to determine whether they are suitable wastes the buyer's time and adds to the inefficiency of the home-buying experience.

Therefore, it would be beneficial to have a superior system and method for searching real estate listings.

SUMMARY OF THE INVENTION

The needs set forth herein as well as further and other needs and advantages are addressed by the present embodiments, which illustrate solutions and advantages described below.

The method for searching real estate according to the present teachings comprises the steps of, but is not limited to, providing a server, providing a plurality of suggestive images not of real estate properties, each suggestive image having one or more associated keywords, providing a plurality of real estate listings, each real estate listing having one or more of the keywords associated therewith, providing a user interface in communication with a user computer, receiving a user's imagery ratings of the plurality of suggestive images, searching the real estate listings, on the server, for search results using the user's imagery ratings of the suggestive images, and sending the search results to the user computer over a network.

The system of the present embodiment includes, but is not limited to a server, a plurality of suggestive images not of real estate properties, each suggestive image having one or more associated keywords, a plurality of real estate listings, each real estate listing having one or more of the keywords associated therewith, a user interface in communication with a user computer, the user interface providing for a user to rate the plurality of suggestive images, and search software on the server identifying search results of real estate listings using the user's imagery ratings of the suggestive images. The search results are sent to the user computer over a network.

Other embodiments of the system and method are described in detail below and are also part of the present teachings.

For a better understanding of the present embodiments, together with other and further aspects thereof, reference is made to the accompanying drawings and detailed description, and its scope will be pointed out in the appended claims.

DETAILED DESCRIPTION OF THE INVENTION

The present teachings are described more fully hereinafter with reference to the accompanying drawings, in which the present embodiments are shown. The following description is presented for illustrative purposes only and the present teachings should not be limited to these embodiments. Any computer configuration and architecture satisfying the speed and interface requirements herein described may be suitable for implementing the system and method of the present embodiments.

Current real estate searches focus on traditional objective attributes instead of more subjective personal tastes. The system according to the present teachings provides a novel way to search real estate listings that addresses the failings of current search techniques. The present teachings take into account a buyer's style preferences and emotive responses (e.g., tastes, etc.) to narrow down options, although not limited thereto. In one embodiment, by providing a user with a series of images (e.g., architectural features, scenery, decor, etc.) and allowing him or her to indicate reaction to the images, it is possible to develop a profile of the buyer for searching real estate listings. Using imagery in this way may allow the creation of a user's personal preferences profile that is far more telling than the traditional objective property attributes. Additional search criteria can be utilized to further narrow the focus.

Figure 1:
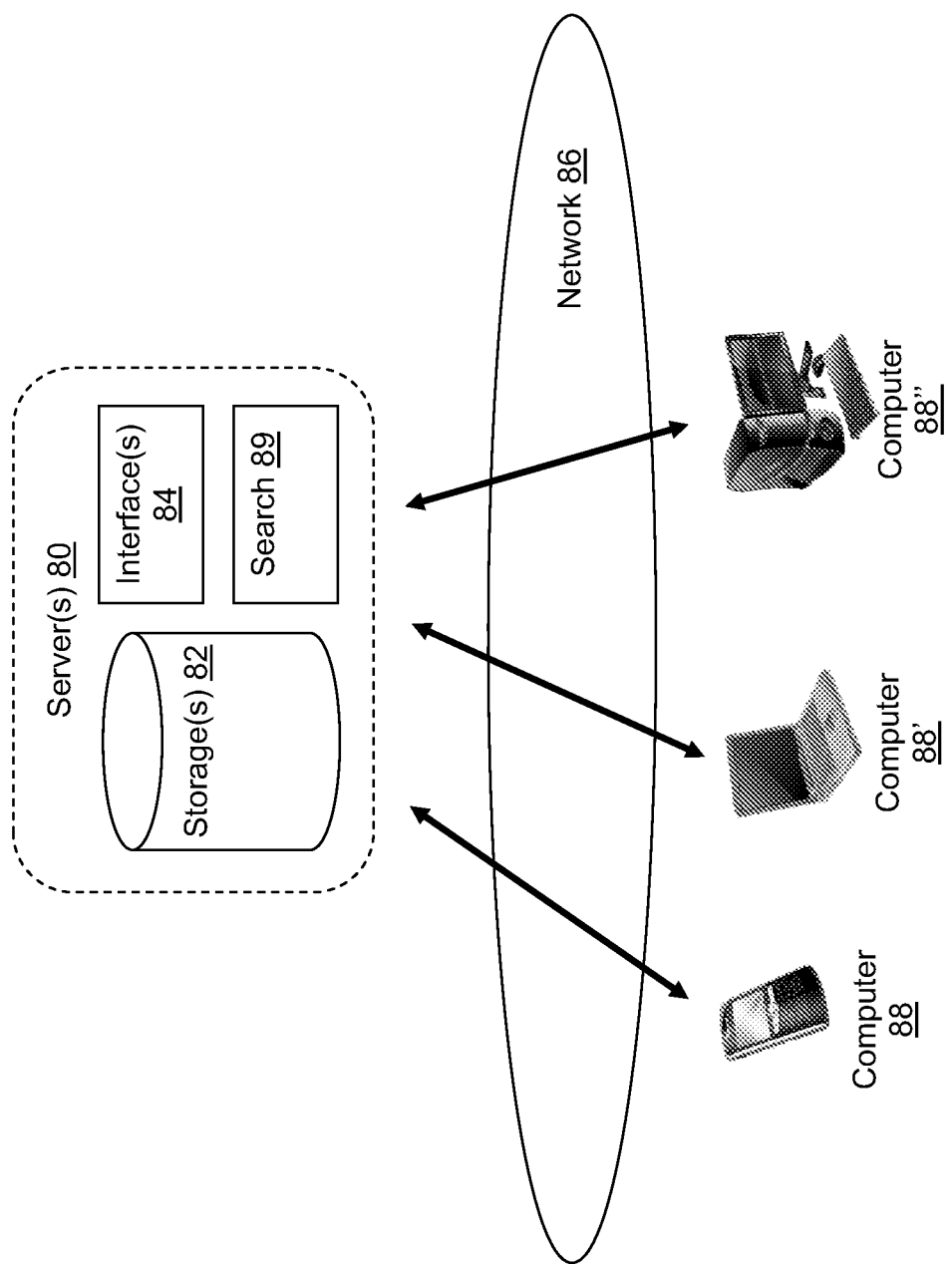
FIG. 1 is a schematic diagram depicting one embodiment of the system according to the present teachings.

Referring now to FIG. 1, shown is a schematic diagram depicting one embodiment of the system according to the present teachings. As shown, the system may comprise one or more storages 82, which may be databases, although not limited thereto. Storage(s) 82 may contain suggestive images, real estate listings, user profile information, or any other data used by system according to the present teachings and discussed further below. For example, real estate listings may be stored in one or more third-party databases (e.g., multiple listing service, etc.), local databases, brokers' databases, or any combination thereof, although not limited thereto.

One or more servers 80 may be in communication with the storage 82. In this way, server 80 may access storage 82 in order to serve data and other related functionality to computers 88,88',88" over a network 86 such as the Internet, although not limited thereto. Server may also be in communication with one or more interfaces 84, which may include a graphical user interface for accessing the system functionality, although not limited thereto. In addition, system may have search 89 functionality to search real estate listings for appropriate listings to return to a user. This functionality may be provided in hardware and/or software executing on a computer readable medium, although not limited thereto.

Figure 2:
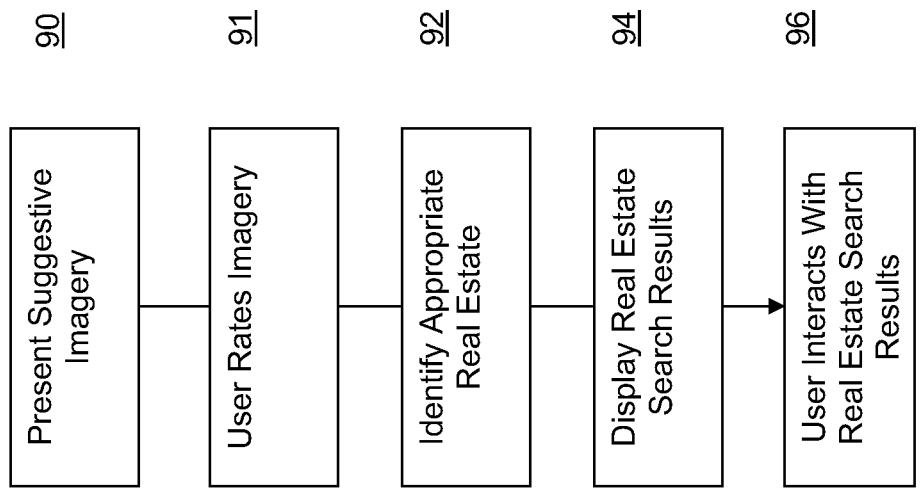
FIG. 2 is a flowchart depicting one embodiment of the method according to the system of FIG. 1.

Referring now to FIG. 2, shown is a flowchart depicting one embodiment of the method according to the system of FIG. 1. The user may first be presented with a number of suggestive images 90 which the user may rate 91. Based upon the ratings assigned by the user, although not limited thereto, appropriate real estate may be identified 92 that satisfy the user's tastes. The real estate search results may then be displayed 94 to the user and the user may then interact 96 with the search results to further filter them (discussed further below), although not limited thereto. Interaction may include obtaining more information on a particular real estate listing, saving it to "favorites", contacting the listing broker, or any number of other things as will be appreciated by one skilled in the art.

Figure 3:
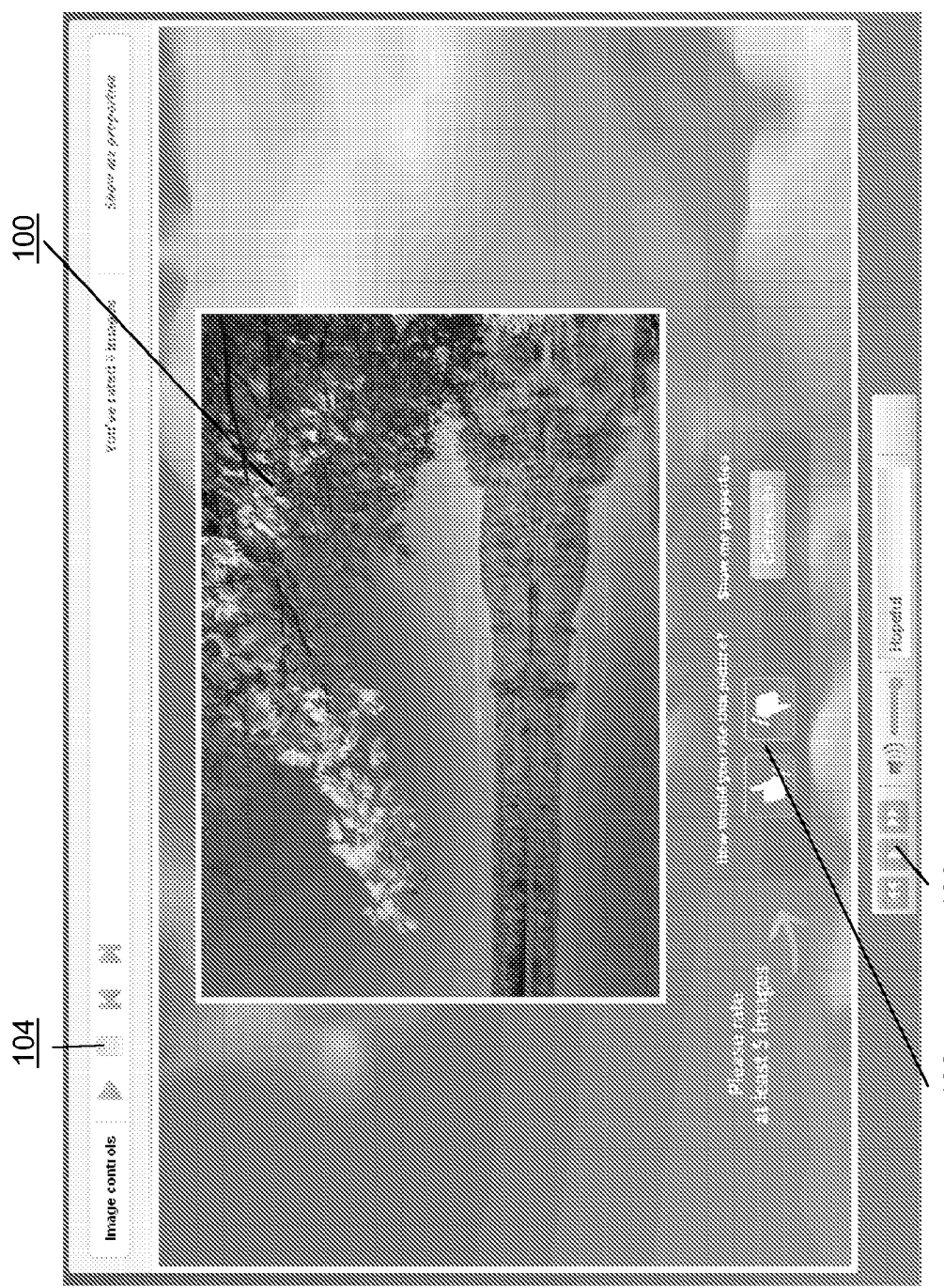
FIG. 3 is an illustration of one embodiment of the graphical user interface according to the system of FIG. 1 whereby a user is asked to rate imagery.

Referring now to FIG. 3, shown is an illustration of one embodiment of the graphical user interface according to the system of FIG. 1 whereby a user is asked to rate imagery 100. A user may be presented with imagery 100. Rating controls 102 may be provided to allow the user to easily and quickly indicate a reaction to the imagery 100. Rating particular imagery 100 helps to identify relevant real estate listings by applying a user's emotive reactions to visual stimuli. For example, although not limited thereto, imagery 100 of a lake (as shown) may indicate a user's desire for tranquility in a property whereas imagery of a toolbox (not shown) may indicate a user's desire for a fixer-upper.

The search algorithm, discussed in detail below, may require that a user first rate a predetermined number of images (e.g., 5, etc.) before search results may be displayed. It is to be appreciated that the more imagery 100 that a user rates, the more complete the user's profile and the greater accuracy the search results will be. If a user opts to display the search results without first rating any images, the algorithm may display a property at random, although not limited thereto. As the user interacts with the search results (e.g., rating specific properties, discussed further below) the user's preferences become more apparent and the user's preference profile can be expanded in order to narrow the search of properties even further.

In one embodiment, although not limited thereto, real estate listings may be categorized (e.g., associated) with keywords which relate to emotive properties of the imagery 100. For example, an image of a lake may be categorized as "tranquil" while an image of a mountain may be categorized as "scenic." Such images are not of any particular real estate listing. Software executing on a computer readable medium may be used to automatically evaluate image attributes of images uploaded to the system. As the user rates images with rating controls 102, the algorithm is able to pare down the search results based upon the user's identified preferences and the available real estate listings. This functionality provides a new real estate search experience that gives consumers the chance to explore the intangibles represented by suggestive images 100.

Image controls 104 may be provided which allow the user to navigate the imagery 100. In one embodiment, although not limited thereto, the imagery 100 may be presented as a slideshow whereby they rotate on a timer. In this way, for example, the user may rate the imagery 100 using the rating controls 102, and then the image will change, or the user may choose not to rate a particular image and a new image will appear after a predetermined amount of time (e.g., 5 seconds, etc.). Once a user rates an image it may not be necessary to show that image again. Image controls 104 may provide further control over the presentation of images by allowing the user to pause the "slideshow" or move forward or backward in the rotation.

In addition, the system may provide audio stimuli and music controls 106, although not limited thereto. The music may be paired with particular imagery 100, the user's preference profile, or the search results, although not limited thereto. This provides a unique combination of visual and audio stimuli. Using the music controls 106, a user may self-select tracks of music to customize the real estate searching experience, although not limited thereto.

Figure 4:
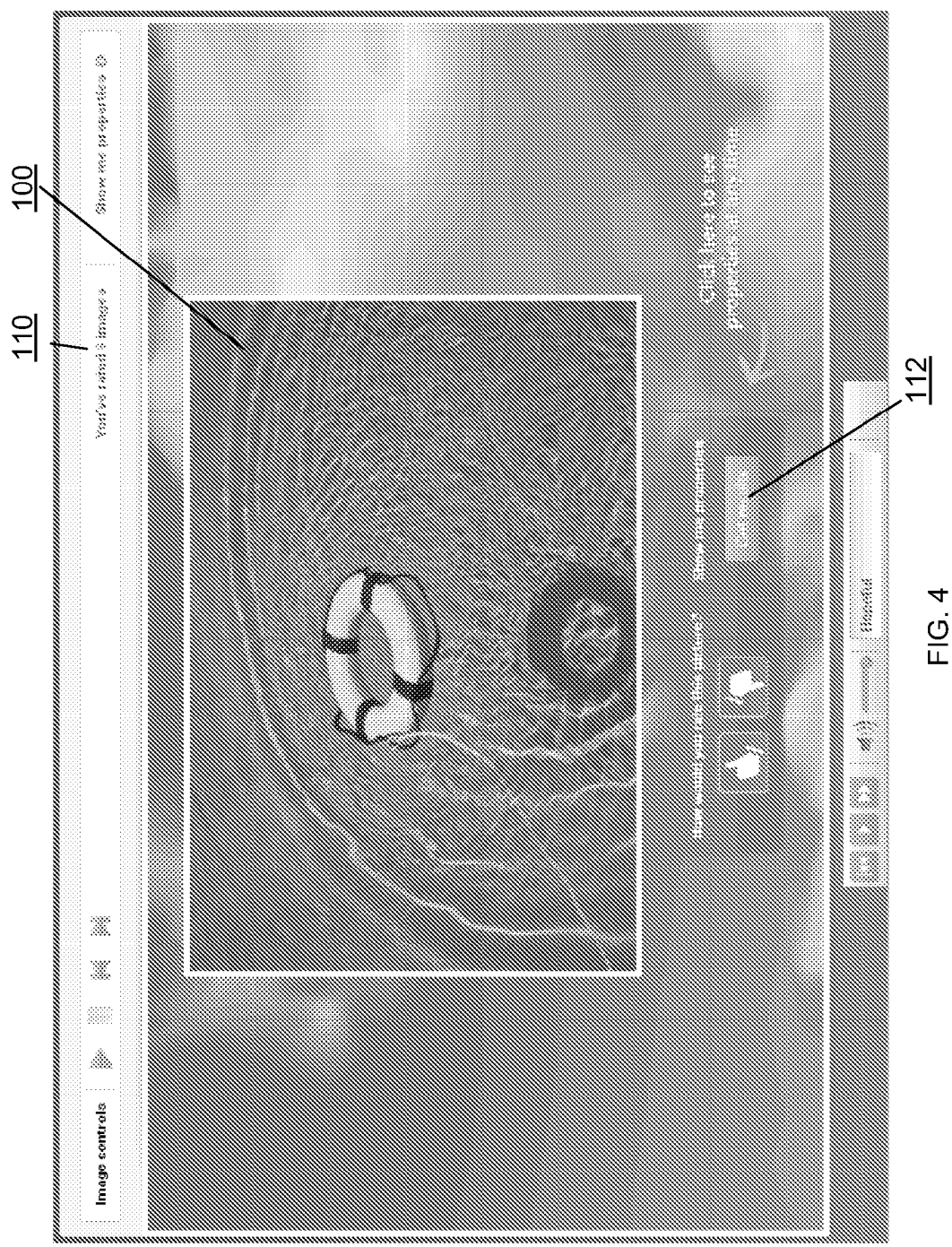
FIG. 4 is another illustration of the graphical user interface of FIG. 3.

Referring now to FIG. 4, shown is another illustration of the graphical user interface of FIG. 3. Using imagery 100 to determine a user's preferences alters and enhances the experience of searching for a home. A visually driven real estate search platform helps "dreamers" find the home of their dreams. Instead of limiting search options to zip code or the number of bedrooms, users may use rating controls 102 to rate abstract images with a "thumbs up" or "thumbs down" from landscape scenery to images of snowmobiles and taxicabs. At any time, the user can submit a query to get results 112 and the system will identify real estate listings that are a good fit.

The system may show the number of images that the user has rated with a ratings indicator 110. This way, the user can track the number of rated images in an effort to provide a number of ratings adequate to generate a targeted search result. Once the user rates a sufficient number of images, the user may select a results button 112 in order to be provided the search results (shown in FIG. 5).

The Internet is often the first stop for potential home buyers and sellers, so one objective of the present teachings is to make the online home-searching process as enjoyable and efficient as possible. Accordingly, the system and method of the present teachings may be provided through a general user interface on a website so that users may access it through a web browser from anywhere at any time. Each of the pieces of functionality may be provided by software executing on a computer readable medium.

Figure 5:
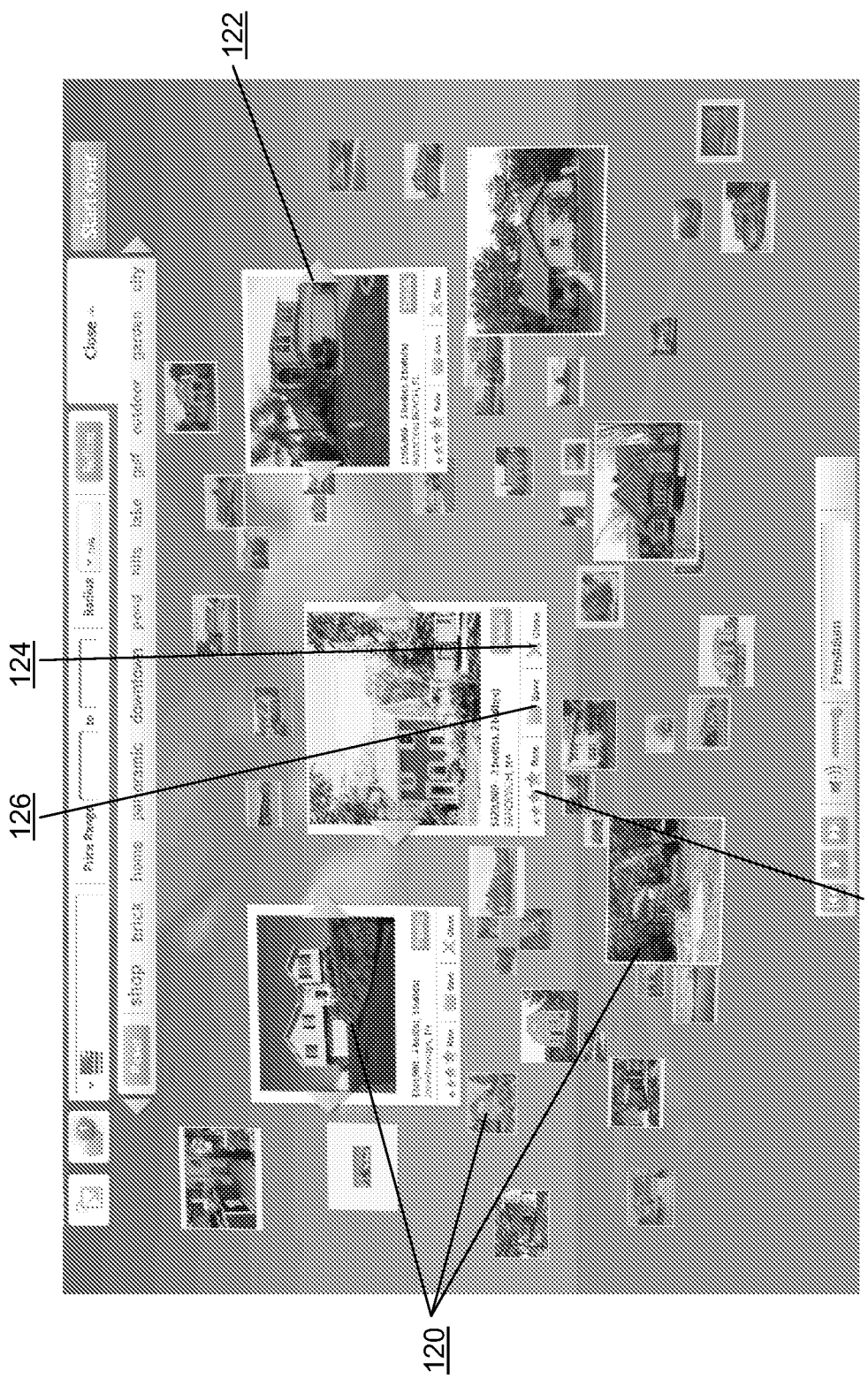
FIG. 5 is an illustration of one embodiment of the graphical user interface according to the system of FIG. 1 whereby real estate search results are displayed.

Referring now to FIG. 5, shown is an illustration of one embodiment of the graphical user interface according to the system of FIG. 1 whereby real estate search results are displayed. Based upon user preferences, determined by the rating of images or specific properties, search results of individual properties may be shown which may appeal to the user. As shown, the presentation of results may be in the form of a visual map, although not limited thereto, where a larger image size indicates a better match to the user's unique preferences.

Each individual real estate listing 120 may enlarge as a user hovers a cursor over it or performs some other action that indicates interest in the listing. When the individual real estate listing 120 enlarges, it may provide additional data about the real estate, including a photograph, price, location, or some other attribute. Photograph controls 122 may permit the user to navigate easily through the photographs associated with the listing from the search results screen. If a user likes the particular property the user may save it with a save button 126 or use a close button 124 to remove the individual real estate listing 120 from the results, although not limited thereto.

Each individual real estate listing 120 may include listing rating controls 128 that allow a user to rate the individual listing. Additional properties may be suggested based on property ratings. As the user interacts with the system, whether by rating images or properties, saving images, search criteria, or performing any other action, the algorithm may compile and use that data to provide listings that are more pertinent. For example, although not limited thereto, based on image ratings of a user, properties may be suggested from the property ratings of similar (e.g., like-minded) users. Additional listings of interest may be based on a range of characteristics including those with users select as "preferred."

Figure 6:
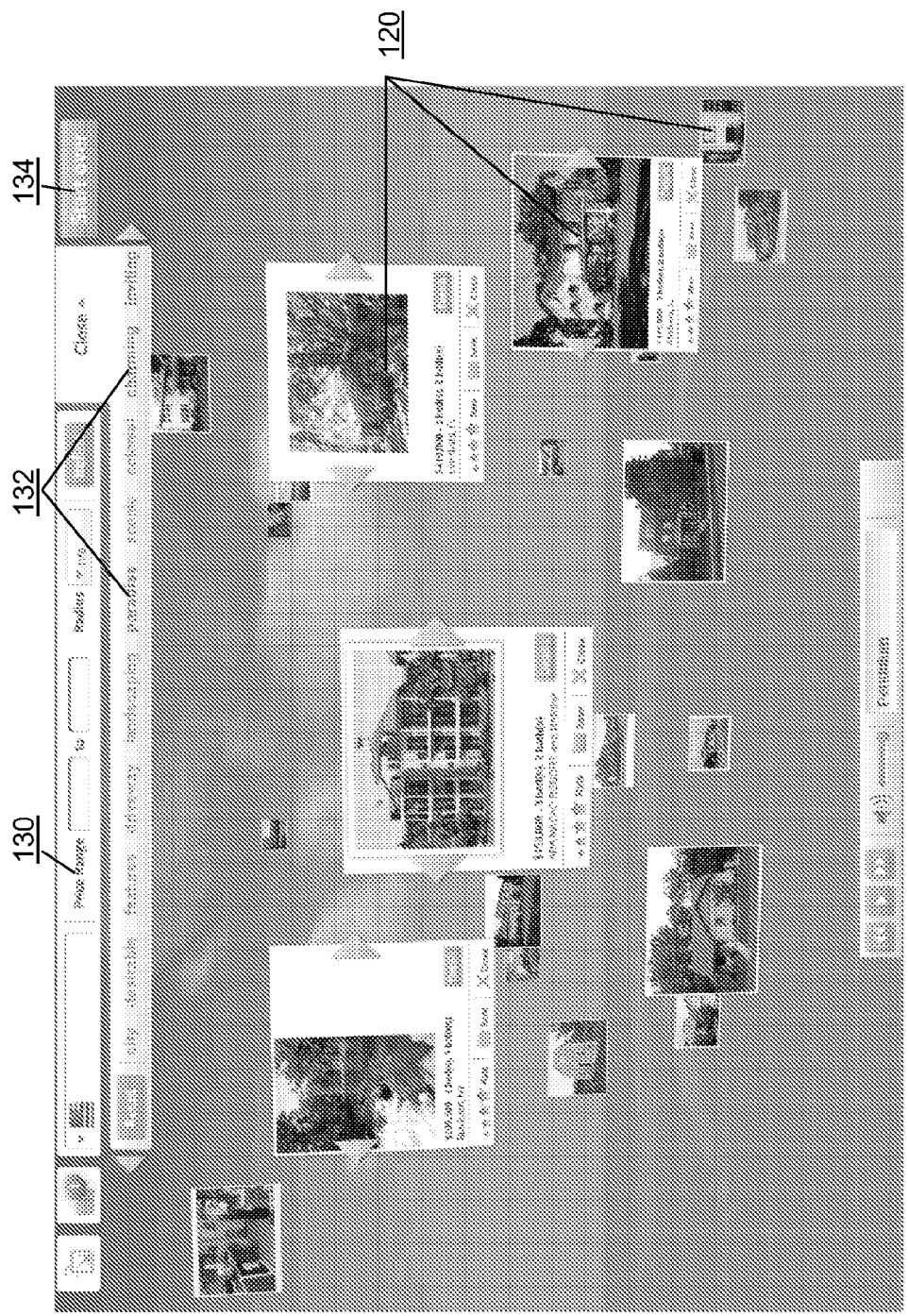
FIG. 6 is another illustration of the graphical user interface of FIG. 5.

Referring now to FIG. 6, shown is another illustration of the graphical user interface of FIG. 5. For those who prefer a more traditional approach to searching for a home, the system may provide traditional search criteria 130 such as price, location, number of bedrooms and bathrooms, square footage, acreage, type of home, community information, or any number of attributes related to a property.

In addition, the system may provide keyword searching 132 capabilities so that users can more easily narrow down the properties they are interested in viewing. Users may be provided with keyword terms to prioritize and de-prioritize listing results based on a set of keyword terms relevant to the search results. If the user is done searching and wishes to start over from the beginning, the user may select the start over button 134 and return to the image ratings screens (shown in FIGS. 3 and 4).

Figure 7:
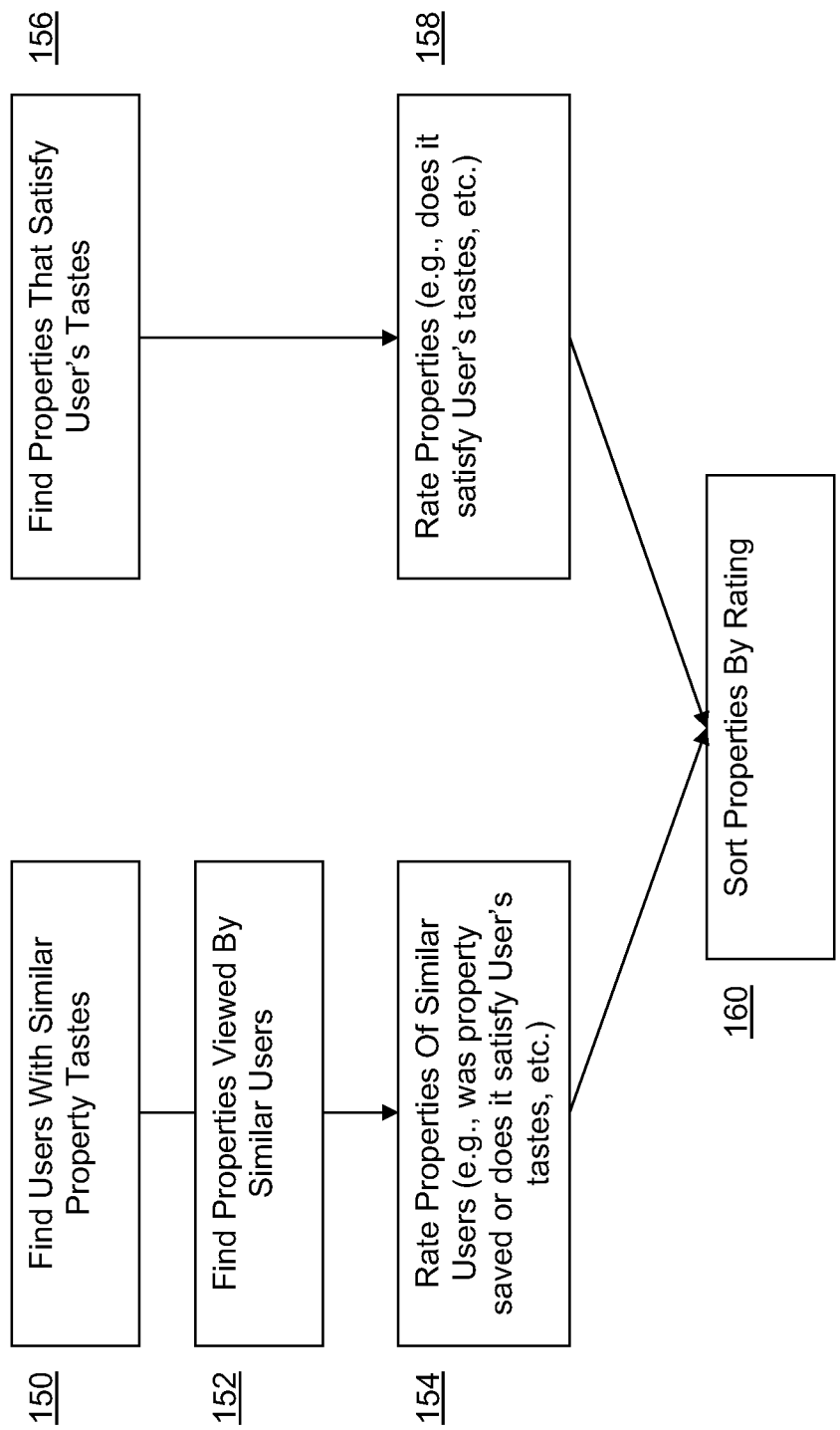
FIG. 7 is a flowchart depicting one embodiment of a search algorithm according to FIG. 1 whereby appropriate real estate is identified.

Referring now to FIG. 7, shown is a flowchart depicting one embodiment of a search algorithm according to FIG. 1 whereby appropriate real estate is identified. The system and method of the present teachings may employ a number of different algorithms to return appropriate real estate and the present teachings are not limited to any particular embodiment presented herein. In one embodiment, the system may utilize the user's rated imagery (e.g., imagery ratings profile) to return real estate that both satisfies the user's indicated tastes as well as real estate that has been viewed and/or rated by other users with similar tastes, although not limited thereto.

In one embodiment, the rated images may each correspond with a particular keyword (e.g., solitude, water view, etc.) and each property may similarly be identified with keywords (e.g., private lot, has a water view, etc.). Properties may be identified which satisfy the user's preferences (e.g., each property has one or more keywords associated therewith which are associated with images rated positively by the user). The found properties may then each be rated 158 based upon how many of the user's tastes it appeals to. For example, the rating for each property may be incremented for each associated image (e.g., has associated keyword which is also associated with suggestive image, etc.) which the user liked (e.g., rated positively, etc.).

In one embodiment, particular key words may be hierarchically valued. For example, if a user positively rates an image corresponding with the keyword "fixer-upper" the system may rank properties associated with that keyword by incrementing by a value of one, but if a user positively rates an image corresponding with the keyword "mountain views" the system may rank properties associated with that keyword by incrementing by a value of two. Accordingly, certain keywords may have more ranking value (e.g., importance to the user, etc.) than others. Such a hierarchy may be predefined by the system, or determined by the user who may create a hierarchy in his or her user profile stored by the system.

In one embodiment, keywords may correspond with each other. For example, a keyword "large home" may correspond with an opposite "small home." In this way, if a user positively rates an image associated with "large home" (or negatively rates an image associated with "small home"), not only will properties associated with the keyword "large home" be incremented for the purpose of ranking, but properties associated with the keyword "small home" may be decremented. In addition, the incrementing/decrementing may have different values, such that a user's indication of liking something may increment a ranking by the value of one, but a user's dislike of something may decrement a ranking by the value of two, although not limited thereto.

Based upon the imagery rated by the user, similar users may be identified 150 (e.g., other users with similar imagery ratings, etc.). For example, if a user positively rates 30 images, a similar user who also positively rated those images (or some subset) may be identified, although not limited thereto. Properties viewed and/or rated by the similar user(s) may then be identified 152. Those properties may then be rated 154 for the current user based on, for example, the user's rated imagery. In one embodiment, although not limited thereto, the properties viewed by similar users may be rated by incrementing them by one for each associated image (e.g., has associated keyword which is also associated with suggestive image, etc.) which the current user liked (e.g., rated positively, etc.). Similarly, a property rating may be decremented by one for each associated image that the user disliked. A property may be incremented by a larger value, e.g. 5, if the property was saved or otherwise rated positively by a similar user, although not limited thereto.

In one embodiment, multiple similar users may be identified, each having varying similarity. So, for example, properties rated positively by a similar user having the exact same imagery rating profile of the current user may be incremented by a larger value (e.g., 5) than a similar user who only shares some subset of the current user's positively rated imagery profile (e.g., 1-4, based on similarity of profile). It is to be appreciated that appropriate real estate may be identified using any number of weighted ratings based upon the current user's and/or a similar user's imagery ratings and/or property ratings, and the present teaching are not limited to any particular embodiment disclosed herein.

Finally, all of the properties may then be sorted 160 according to their assigned rating value and displayed to the user. In reference to FIGS. 5 and 6, a higher rating may mean that the graphical user interface displays that particular property as a larger image, although not limited thereto.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A method for searching real estate, comprising the steps of:
providing a server;
providing a plurality of images not of real estate properties, each image having one or more associated keywords;
providing a plurality of real estate listings, each real estate listing having one or more of the keywords associated therewith;
providing a webpage in communication with a user computer;
receiving a user's imagery ratings of a predetermined number of the plurality of images through the webpage and developing a user profile using the received imagery ratings, the received imagery ratings including a positive or negative rating for each of the predetermined number of the plurality of images, the predetermined number of the plurality of images displayed sequentially so the user can rate them one at a time;
searching the real estate listings, on the server, using the user profile, by associating images rated positively by the user with property characteristics of the real estate listings, and identifying similar real estate listings to real estate listings positively rated by the user; and
sending the search results to the user computer over a network, the search results comprising a visual map where a larger size of a real estate listing indicates a closer match to the user's preferences, the real estate listing comprising an image; wherein the user must first rate the predetermined number of the plurality of images before search results are displayed, the predetermined number of the plurality of images including at least five images.

2. The method of claim 1 the network is the Internet.

3. The method of claim 1 wherein the webpaqe is shown on a mobile device.

4. The method of claim 1 further comprising the step of filtering the search results by a user preference.

5. The method of claim 1 further comprising the step of playing music to the user while the user rates the images.

6. The method of claim 1 wherein the step of searching comprises identifying real estate listings viewed by other users having similar imagery ratings to the user's imagery ratings.

7. The method of claim 6 wherein the webpage provides for the user to rate real estate listings in the search results, and the step of searching comprises identifying real estate listings positively rated by the other users.

8. The method of claim 1 wherein the webpage provides for the user to rate real estate listings in the search results.

9. The method of claim 1, wherein the plurality of real estate listings is stored in database controlled by a third party multiple listing service.

10. The method of claim 1, wherein the plurality of real estate listings is stored in a database; and wherein both the server and the database are under the physical control of the same entity.

11. The method of claim 1 wherein the step of searching comprises identifying search results of real estate listings by assigning each real estate listing a numerical value using the user's imagery ratings.

12. The method of claim 1 wherein the step of searching comprises identifying search results of real estate listings rated positively by other users having imagery ratings similar to the user's imagery ratings.

* * * * *